US005395209A

United States Patent [19]

Busse et al.

[11] Patent Number: 5,395,209

[45] Date of Patent: Mar. 7, 1995

[54] PALLETIZER

[75] Inventors: Brian E. Busse; John B. Dart, both of Madison, Wis.

[73] Assignee: Busse Bros. Inc., Randolph, Wis.

[21] Appl. No.: 870,629

[22] Filed: Apr. 17, 1992

[51] Int. Cl.[6] .................. B65G 1/18

[52] U.S. Cl. .................. 414/799; 187/236; 187/269

[58] Field of Search .................. 187/9 R, 18, 8.71; 414/799, 403; 74/89.21, 521, 506; 474/106, 102, 109, 135, 133

[56] References Cited

U.S. PATENT DOCUMENTS

| | | | |
|---|---|---|---|
| 1,458,032 | 6/1923 | Cornell | 187/18 |
| 2,241,798 | 5/1941 | Weiss | 187/9 R |
| 3,350,065 | 10/1967 | Mankey | 74/521 |
| 3,522,890 | 8/1970 | Birchall | 414/791.7 |
| 4,419,035 | 12/1983 | Stobb | 414/799 |
| 4,667,808 | 5/1987 | Mastak | 198/418.1 |
| 4,834,605 | 5/1989 | Jerred | 414/791.7 |
| 4,909,702 | 3/1990 | Tsuruoka et al. | 414/791.7 |
| 4,946,340 | 8/1990 | Murphy et al. | 414/796.7 |
| 4,987,992 | 1/1991 | Pfleger | 198/475.1 |
| 5,005,681 | 4/1991 | Pipes | 187/9 R |

FOREIGN PATENT DOCUMENTS

| | | | |
|---|---|---|---|
| 1082023 | 5/1960 | Germany | 74/521 |
| 0265942 | 3/1989 | Germany | 474/109 |
| 0161344 | 10/1982 | Japan | 474/109 |

*Primary Examiner*—David H. Bollinger
*Attorney, Agent, or Firm*—Michael, Best & Friedrich

[57] ABSTRACT

A palletizer comprising a main hoist for raising and lowering a pallet, a feed conveyor for moving a layer of patterned objects on to the pallet, a pallet dispenser including a base, a generally horizontally extending pallet supporting member, scissors structure for moving the supporting member vertically relative to the base, a motor having an output shaft, and structure for operably connecting the output shaft to the scissors structure such that the supporting member moves upward at a generally constant velocity in response to rotation of the output shaft at a generally constant rotational velocity, and structure for conveying pallets from the pallet dispenser to the main hoist.

10 Claims, 3 Drawing Sheets

PALLETIZER

FIELD OF THE INVENTION

The invention relates to palletizers.

BACKGROUND OF THE INVENTION

A conventional palletizer comprises a pallet dispenser, a main hoist, a conveyor between the pallet dispenser and the main hoist, and a feed conveyor for moving a layer of patterned objects onto a pallet or onto a separator sheet placed on top of a previously deposited layer of objects. The pallet dispenser includes a hoist, as is known in the art. The main hoist lowers the pallet so that the top of the pallet or the top of the previously deposited layer of objects is even with upper surface of the feed conveyor. Such a palletizer is disclosed in U.S. Pat. No. 4,834,605, which issued May 30, 1989, which is assigned to the assignee hereof, and which is incorporated herein by reference.

SUMMARY OF THE INVENTION

The invention provides a palletizer with an improved main hoist and an improved pallet dispenser hoist.

The main hoist is electrically driven and has a motor driving the top shaft through a gear box and connecting chain. Also mounted on the shaft is a pneumatically released brake that holds the hoist in position in absence of torque from the motor. Also on this shaft are the drive sprockets and lift chains that are connected to the arm mechanism of the hoist. The lift chains pass over the drive sprockets and down around idler sprockets. A tightener sprocket engages the slack side of each chain loop. The tightener sprockets are located as close as possible to the idler sprockets. Locating the drive on the top shaft minimizes the amount of chain that is subject to load forces. Locating the holding brake on the drive shaft and not on the motor minimizes the number of drive components between the load and the brake. This reduces the probability of the load falling precipitously if the motor or the connecting chain breaks. A negative overtravel switch detects insufficient slack in the chain.

The pallet dispenser hoist is electrically driven, and vertical movement is provided by a scissors mechanism. An electric motor turns a cam through a reduction system. Attached to the cam is a chain that loops around a sprocket attached to the "free" end of the scissors mechanism. Rotation of the cam pulls on the chain and "squeezes" the base of the scissors mechanism, thereby raising the hoist. The profile of the cam is such that rotation of the cam at a constant rotational velocity causes upward movement of the hoist at a constant velocity. This provides several advantages. First, total input power is constant; the drive does not have to be sized to accommodate a peak power demand. Second, torque in the drive train is also constant; drive torque is directly proportional to lift force. This allows sensing overtorque in the drive train to indicate system overload without having the trip value change over the range of motion. Third, the constant velocity of the hoist allows for consistent overtravel distance past any sensors that read vertical position and indicate the need to stop or pause motion as needed in the machine cycle.

Other features and advantages of the invention will become apparent to those skilled in the art upon review of the following detailed description, claims and drawings.

Figure 1:
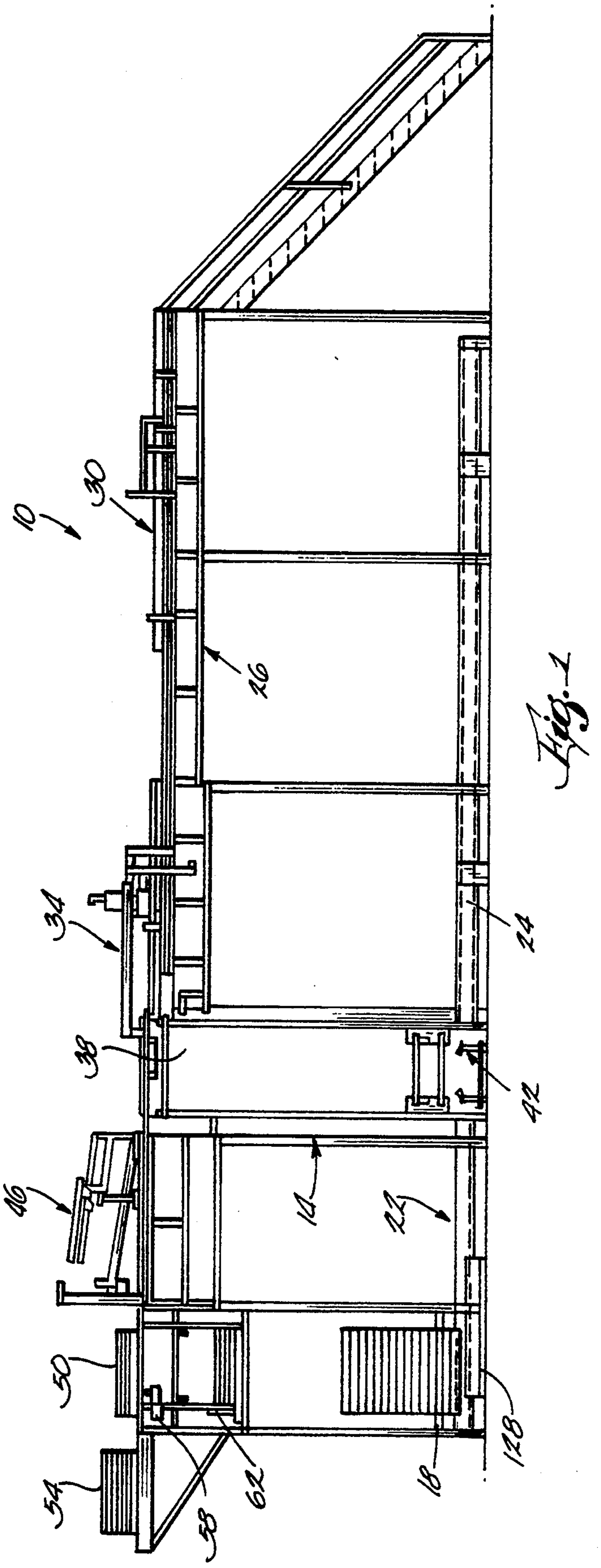
FIG. 1 is a schematic elevational view of a palletizer embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A palletizer 10 embodying the invention is illustrated in the drawings. The palletizer 10 comprises (see FIG. 1) a main hoist 14 (described below in greater detail), a pallet dispenser 18 (described below in greater detail) and a conveyor 22 between the pallet dispenser and the main hoist. The palletizer 10 also comprises an output conveyor 24, a feed conveyor 26, an apparatus 30 for arranging objects on the feed conveyor into a honeycomb pattern (such as the apparatus disclosed in U.S. Pat. No. 4,834,605) and a sweep mechanism 34 for moving a layer of patterned objects onto a pallet supported by the main hoist or onto a separator sheet placed on top of a previously deposited layer of objects. The main hoist 14 includes a positive overtravel switch 38 and a negative overtravel switch 42. The palletizer further comprises a separator sheet feeder 46 which feeds separator sheets from a stack 50 of separator sheets onto previously deposited layers of objects. A standby load 54 of separator sheets is also shown. A top frame feeder sweep drive 58 takes a top frame from a stack 62 of top frames and places it on top of the uppermost layer of objects on the pallet. The palletizer 10 as thus far described is conventional and will not be described in greater detail.

Figure 2:
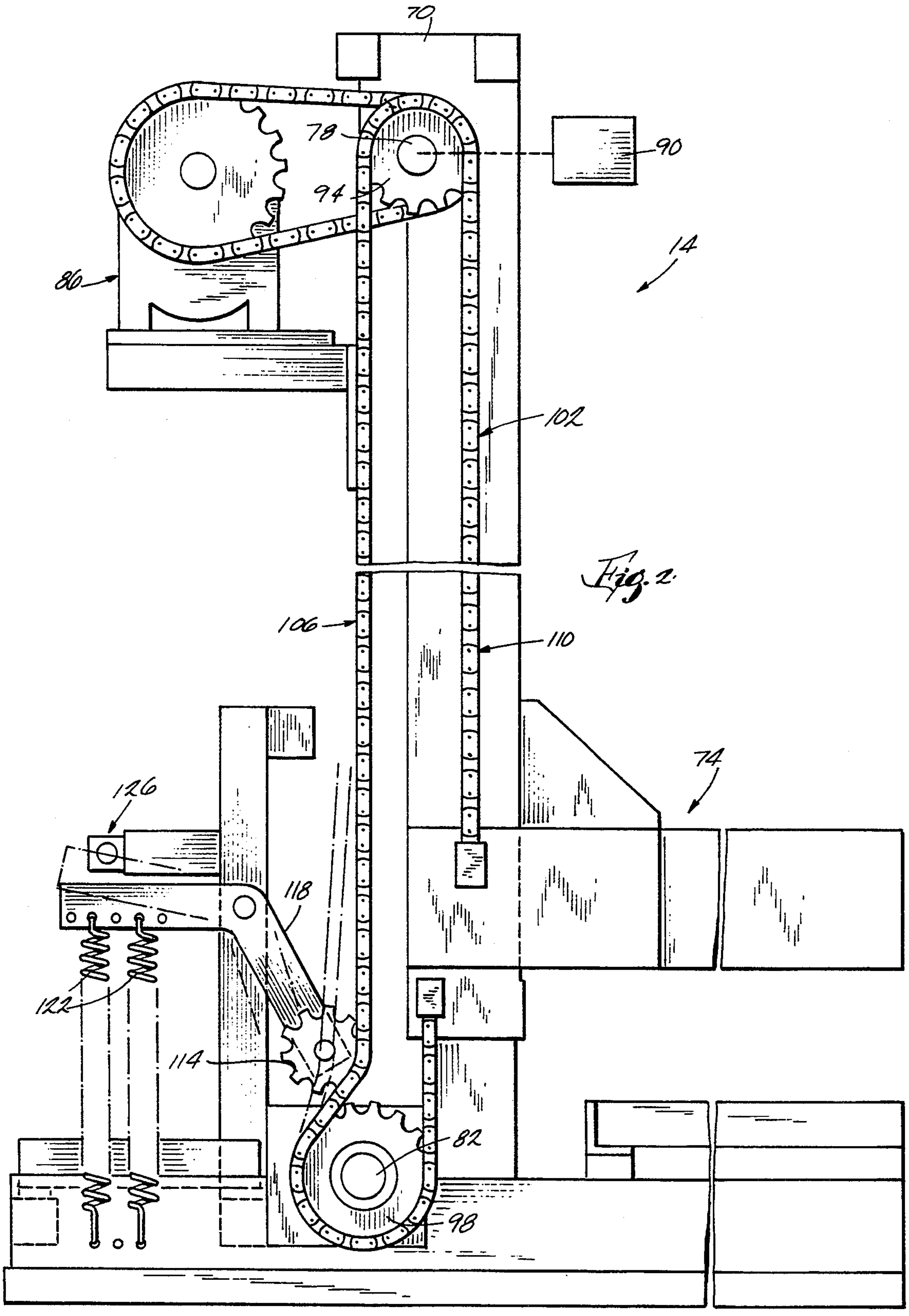
FIG. 2 is an elevational view, partially broken away, of the main hoist.

The main hoist 14 includes (see FIG. 2) a frame 70 and an arm mechanism 74 which is movable vertically relative to the frame and which is adapted to support a pallet. Upper and lower shafts 78 and 82 are supported by the frame 70. An electric motor 86 is supported by the frame and is drivingly connected to the upper shaft 78. A pneumatically released safety brake 90 (shown schematically) and a pair of drive sprockets 94 (only one is shown) are mounted on the upper shaft 78. A pair of idler sprockets 98 (only one is shown) are mounted on the lower shaft 82. The main hoist thus includes first and second sprocket sets (one is shown in FIG. 2), with each set including a drive sprocket 94 and an idler sprocket 98.

Passing around the drive sprocket 94 and the idler sprocket 98 of each sprocket set is a chain 102 having one end connected to the bottom of the arm mechanism 74 and an opposite end connected to the top of the arm mechanism 74. Movement of the chain 102 around the sprockets 94 and 98 causes vertical movement of the arm mechanism 74 relative to the frame. The chain 102 forms a loop having a slack side 106 (the left side in FIG. 2) and a load side 110 (the right side in FIG. 2). The arm mechanism 74 is connected to the load side. As shown in FIG. 2, counterclockwise movement of the drive sprocket 94 causes upward movement of the arm mechanism 74.

The main hoist 14 further comprises a tightener sprocket 114 engaging the slack side of the loop, and means for biasing the tightener sprocket against the slack side. Preferably, as shown in FIG. 2, the tightener sprocket is pivotally supported by a lever 118 that is in turn pivotally supported by the frame 70, and a pair of springs 122 extending between the outer end of the lever 118 and the frame 70 bias the tightener sprocket against the slack side of the loop.

The main hoist 14 further includes means for detecting insufficient slack in the slack side of the loop. This means preferably includes means for detecting movement of the tightener sprocket 114 against the biasing means (to the left in FIG. 2). The means for detecting movement of the tightener sprocket preferably includes a sensor 126 located so as to sense pivotal movement of the lever 118 in the clockwise direction.

The pallet dispenser 18 includes (see FIGS. 3 and 4), as is known in the art, a hoist mechanism 128. More particularly, the pallet dispenser includes a base 130 and a generally horizontally extending pallet supporting member 134. The pallet dispenser further includes scissor means 138 for removing the supporting member 134 vertically relative to the base. The scissor means includes a first member 142 having a lower end pivotally connected to the base and an upper end connected to the supporting member for horizontal sliding movement relative thereto. The scissor means also includes a second member 146 having an upper end pivotally connected to the supporting member and having a lower end connected to the base for horizontal sliding movement relative thereto. The first and second members 142 and 146 are connected to each other for relative pivotal movement about an axis 150. Thus, referring to FIGS. 3 and 4, movement of the lower end of the second member 146 to the left causes extension of the scissors mechanism 138 and thereby causes upward movement of the supporting member 134.

Figure 3:
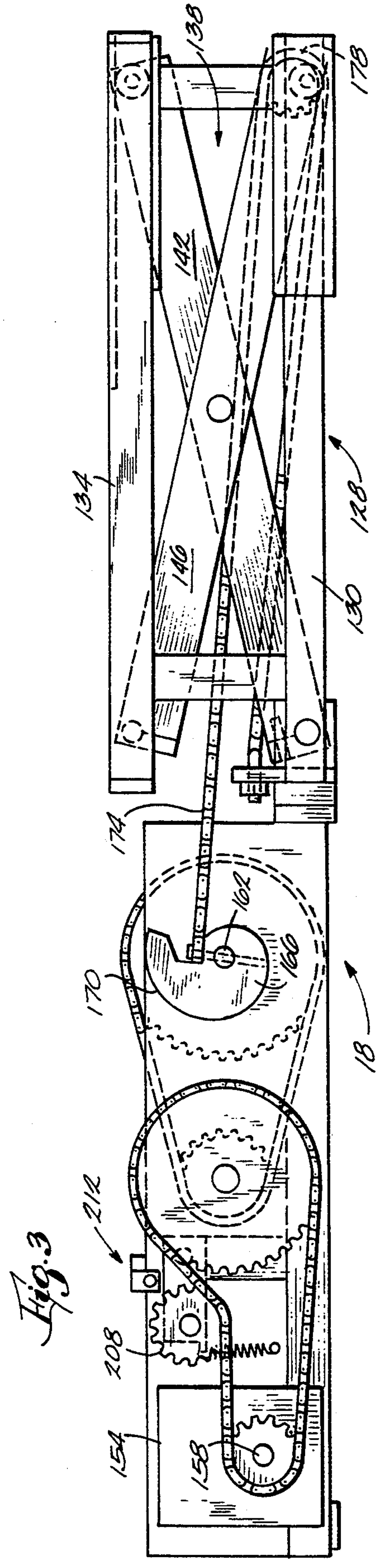
FIG. 3 is an elevational view of the pallet dispenser hoist in its lowered position.
Figure 4:
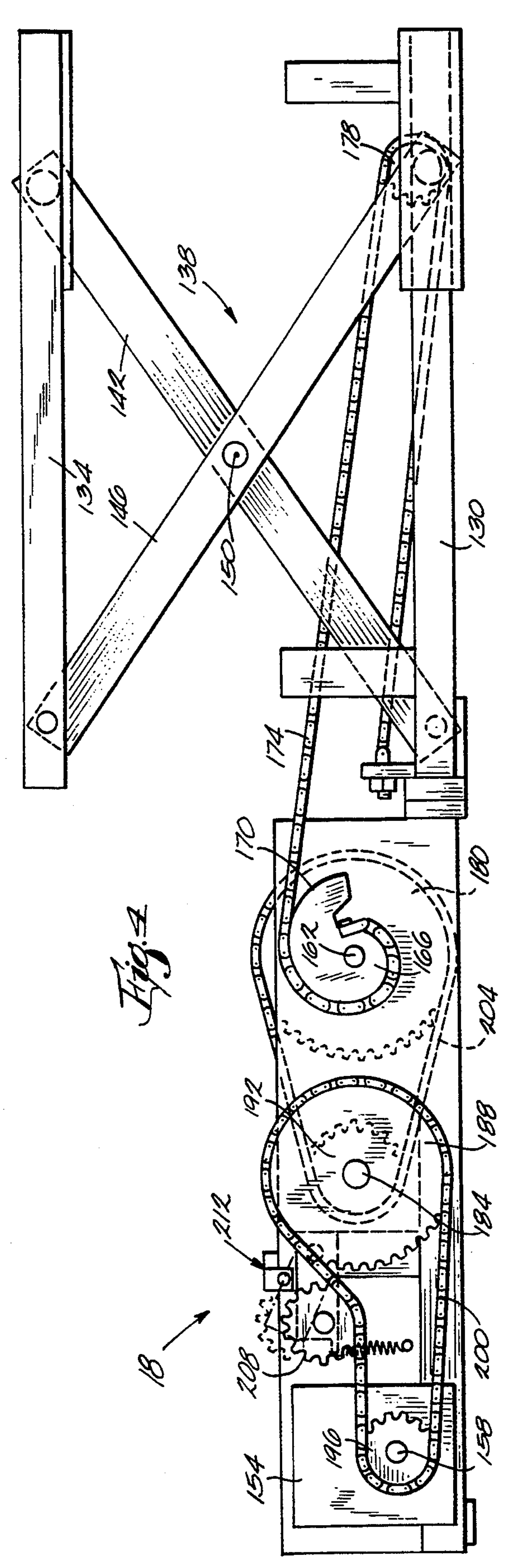
FIG. 4 is a view similar to FIG. 3 of the pallet dispenser hoist in its raised position.

The pallet dispenser 18 further includes means for extending and contracting the scissors means. Such means preferably includes an electric motor 154 having an output shaft 158, and means for operably connecting the output shaft to the scissors means such that the supporting member moves upward at a generally constant velocity in response to rotation of the output shaft 158 at a generally constant rotational velocity. The means for connecting the output shaft to the scissors means includes a cam shaft 162 rotatably supported by the base, means for causing rotation of the cam shaft in response to rotation of the output shaft, a cam 166 which is mounted on the cam shaft 162 for rotation therewith and which has a non-circular outer surface 170, and a chain 174. The chain 174 is connected between the scissors means and the cam such that the chain wraps around the outer surface of the cam in response to rotation of the cam shaft. In the preferred embodiment, as shown in FIGS. 3 and 4, an idler sprocket 178 is rotatably mounted on the lower end of the second member 146, and the chain 174 has one end fixed to the cam 170, passes around the idler sprocket 178, and has an opposite end fixed to the base 130. Thus, counterclockwise rotation of the cam 166 causes the chain 174 to wrap around the outer surface 170 of the cam and pull the idler sprocket 178 to the left (as shown in FIGS. 3 and 4), thereby causing extension of the scissors means.

The outer surface 170 of the cam 166 is shaped with an increasing radius such that, when the cam shaft 162 rotates at a constant rotational velocity, the chain 174 moves at an increasing speed as the cam rotates counterclockwise. The increasing chain speed causes the scissors mechanism to move the supporting member upwardly at a constant velocity.

The means for causing rotation of the cam shaft 162 in response to rotation of the output shaft 158 includes (see FIG. 4) a large sprocket 180 mounted on the cam shaft, an intermediate shaft 184 rotatably supported by the base, a large sprocket 188 mounted on the intermediate shaft, a small sprocket 192 mounted on the intermediate shaft, and a small sprocket 196 mounted on the output shaft 158. A chain 200 drivingly connects the sprockets 196 and 188, and a chain 204 drivingly connects the sprockets 192 and 180.

The pallet dispenser 18 also includes means for sensing overtorque in the chain 200. Preferably, a tightener sprocket 208 is biased against the chain 200, and a sensor 212 detects upward movement of the sprocket. This is similar to the arrangement of the main hoist.

Various features of the invention are set forth in the following claims.

We claim:

1. A palletizer comprising a main hoist for raising and lowering a pallet, a feed conveyor for moving a layer of patterned objects on to the pallet, a pallet dispenser including a base, a generally horizontally extending pallet supporting member, scissors means for moving said supporting member vertically relative to said base, a motor having an output shaft, and means for operably connecting said output shaft to said scissors means such that said supporting member moves upward at a generally constant velocity in response to rotation of said output shaft at a generally constant rotational velocity, and means for conveying pallets from said pallet dispenser to said main hoist.

2. A palletizer as set forth in claim 1 wherein said means connecting said output shaft to said scissors means includes a cam shaft, means for causing rotation of said cam shaft in response to rotation of said output shaft, a cam which is mounted on said cam shaft for rotation therewith and which has a non-circular outer surface, and an elongated flexible member connected between said scissors means and said cam such that said flexible member wraps around said outer surface of said cam in response to rotation of said cam shaft.

3. A palletizer as set forth in claim 2 wherein said flexible member is a chain.

4. A palletizer as set forth in claim 3 wherein said means for causing rotation of said cam shaft in response to rotation of said output shaft includes a chain, and wherein said means connecting said output shaft to said scissors means further includes means for sensing overtorque in said chain.

5. A palletizer comprising a main hoist for raising and lowering a pallet, said main hoist including a frame, an arm mechanism which is movable vertically relative to said frame and which is adapted to support the pallet, an upper shaft supported by said frame, a motor drivingly connected to said upper shaft, a safety brake mounted on said upper shaft, a drive sprocket mounted on said upper shaft for rotation therewith, a lower shaft rotatably supported by said frame, an idler sprocket mounted on said lower shaft for rotation therewith, a chain passing around said drive sprocket and said idler sprocket and having one end connected to the bottom of said arm mechanism and an opposite end connected to the top of said arm mechanism such that movement of said chain around said sprockets causes vertical movement of said arm mechanism relative to said frame, and such that said chain forms a loop having a slack side and a load side, said arm mechanism being connected to said load side, and means for detecting insufficient slack in said slack side of said loop, a feed conveyor for moving a layer of patterned objects on to the pallet, a pallet dispenser, and means for conveying pallets from said pallet dispenser to said main hoist.

6. A palletizer as set forth in claim 5 wherein said detecting means including a tightener sprocket engaging said slack side of said loop, means for biasing said tightener sprocket against said slack side, and means for detecting movement of said tightener sprocket against said biasing means.

7. A hoist apparatus comprising a base, a generally horizontally extending supporting member, scissors means for moving said supporting member vertically relative to said base, a motor having an output shaft, and a linkage operably connecting said output shaft to said scissors means such that said supporting member moves upward at a generally constant velocity in response to rotation of said output shaft at a generally constant rotational velocity.

8. Apparatus as set forth in claim 7 wherein said linkage connecting said output shaft to said scissors means includes a cam shaft, means for causing rotation of said cam shaft in response to rotation of said output shaft, a cam which is mounted on said cam shaft for rotation therewith and which has a non-circular outer surface, and an elongated flexible member which is connected between said scissors means and said cam such that said flexible member wraps around said outer surface of said cam in response to rotation of said cam shaft.

9. Apparatus as set forth in claim 8 wherein said flexible member is a chain.

10. Apparatus as set forth in claim 9 wherein said means for causing rotation of said cam shaft in response to rotation of said output shaft includes a chain, and wherein said linkage connecting said output shaft to said scissors means further includes means for sensing overtorque in said chain.

* * * * *